US012575613B2

(12) United States Patent
Zhou et al.

(10) Patent No.: US 12,575,613 B2
(45) Date of Patent: Mar. 17, 2026

(54) VAPING DEVICE

(71) Applicant: SHENZHEN FUNYIN ELECTRONIC TECHNOLOGY CO., LTD., Shenzhen (CN)

(72) Inventors: Ying Zhou, Shenzhen (CN); Jinfang Zhang, Shenzhen (CN)

(73) Assignee: SHENZHEN FUNYIN ELECTRONIC TECHNOLOGY CO., LTD., Shenzhen (CN)

( * ) Notice: Subject to any disclaimer, the term of this patent is extended or adjusted under 35 U.S.C. 154(b) by 514 days.

(21) Appl. No.: 18/184,584

(22) Filed: Mar. 15, 2023

(65) Prior Publication Data

US 2024/0099393 A1 Mar. 28, 2024

(30) Foreign Application Priority Data

Sep. 28, 2022 (CN) .......................... 202211190751.5

(51) Int. Cl.
| | |
|---|---|
| *A24F 40/60* | (2020.01) |
| *A24F 40/10* | (2020.01) |
| *A24F 40/42* | (2020.01) |
| *A24F 40/46* | (2020.01) |
| *H01M 50/202* | (2021.01) |
| *H01M 50/247* | (2021.01) |
| *H01M 50/262* | (2021.01) |
| *H01M 50/267* | (2021.01) |
| *H01M 50/271* | (2021.01) |

(52) U.S. Cl.
CPC .............. *A24F 40/60* (2020.01); *A24F 40/10* (2020.01); *A24F 40/42* (2020.01); *A24F 40/46* (2020.01); *H01M 50/202* (2021.01); *H01M 50/247* (2021.01); *H01M 50/262* (2021.01); *H01M 50/267* (2021.01); *H01M 50/271* (2021.01); *H01M 2220/30* (2013.01)

(58) Field of Classification Search
CPC ...................................................... A24F 40/60
See application file for complete search history.

(56) References Cited

U.S. PATENT DOCUMENTS

| | | | | |
|---|---|---|---|---|
| 8,739,786 | B2 * | 6/2014 | Postma | A61M 15/0023 |
| | | | | 128/203.26 |
| 12,121,071 | B2 * | 10/2024 | Wanxiang | A24F 40/46 |

FOREIGN PATENT DOCUMENTS

| | | | | |
|---|---|---|---|---|
| CN | 207151940 U | * | 3/2018 | A24F 40/95 |

OTHER PUBLICATIONS

Machine Translation of CN 207151940 (Year: 2025).*

* cited by examiner

*Primary Examiner* — Russell E Sparks
(74) *Attorney, Agent, or Firm* — Inskeep IP Group, Inc.

(57) ABSTRACT

A vaping device is disclosed, which includes: a casing; a microphone assembly provided at the bottom of the casing, wherein a first storage volume and a second storage volume, which are integrally connected, are arranged in the casing and above the microphone assembly, an atomization assembly is installed in the first storage volume and a battery assembly is installed in the second storage volume; and a pivotable cover assembly for replacing a battery, wherein the pivotable cover assembly is configured to be connected to the casing and provided at the top of the first storage volume and the second storage volume.

14 Claims, 10 Drawing Sheets

1205

1206

VAPING DEVICE

RELATED APPLICATIONS

This application claims benefit of and priority to Chinese Patent Application No. 202211190751.5 filed Sep. 28, 2022, entitled Vaping Device, in the China Intellectual Property Office, the entire disclosure of which is incorporated herein by reference for all purposes.

FIELD OF THE INVENTION

The present disclosure relates to the technical field of electronic smoking, in particular to a vaping device.

BACKGROUND OF THE INVENTION

There are two types of vaping devices: electronic atomized cigarette, and a device for heat-not-burn tobacco products. The basic principle of the electronic atomized cigarettes is to atomize glycerin or propylene glycol solutions containing nicotine and flavor components by means of heating, ultrasound, etc., and then generate a vapor (similar to that produced by burning a cigarette) for people to smoke. Most vaping devices heat smoke liquid to replace the tobacco burning process of cigarettes, which releases aroma and nicotine likewise, but the amount of released harmful components such as tar, carbon monoxide, and nitrous acid is greatly reduced compared with traditional cigarettes. It is not easy to produce second-hand smoke pollution, applicable to more places, and has less impact on the surrounding crowd. In recent years, the vaping device has been welcomed by more and more consumers.

The electronic atomization cigarettes currently include closed electronic atomization cigarettes and open electronic atomization cigarettes. The closed electronic atomization cigarettes are cartridge-changing vaping devices being a closed system, that is, there is no need to set product parameters, the product cannot be disassembled at will, and the smoke liquid cannot be injected by users, and the cartridges are for one-time use. The open electronic atomization cigarettes use an open liquid filling chamber, which supports consumers' DIY operation and self-filling to realize recycling. As most users often buy smoke liquid produced by non-regular manufacturers, the ingredients are not reliable, such that the quality of smoke liquid does not meet the standard, and users are likely to add smoke liquid inappropriately when the amount of smoke liquid can be adjusted freely, which will cause harm to the body. Therefore, the electronic atomization cigarettes are the mainstream type of vaping device on the market.

However, the closed electronic atomization cigarettes have a closed construction, such that the product cannot be disassembled at will, and the battery cannot be replaced or taken out. Even if the vaping device is forcibly disassembled to recycle the battery, the battery is easily damaged, and the recycling cost is high as a large number of discarded vaping devices will cause waste of resources and environmental pollution. Moreover, the atomization structure of some products is not set independently of the battery, such that the smoke fluid in the atomizer can easily permeate the battery assembly and cause damage to the battery assembly when in use.

SUMMARY OF THE INVENTION

In view of the deficiencies of the existing technology, a vaping device is provided to realize the removal and installation of batteries, it is suitable for batteries of different lengths and sizes, which improves the convenience and environmental protection of vaping devices. The battery assembly and the atomization assembly are separated to better protect their respective components, so that the atomization assembly and the power supply assembly do not interfere with each other, thereby improving the safety and service life of the vaping device.

In order to achieve the above purpose, the present disclosure adopts the following technical solutions:

A vaping device comprising: a casing; a microphone assembly provided at the bottom of the casing, wherein a first storage volume and a second storage volume, which are integrally connected, are arranged in the casing and above the microphone assembly, an atomization assembly is installed in the first storage volume and a battery assembly is installed in the second storage volume; and a pivotable cover assembly for replacing a battery, wherein the pivotable cover assembly is configured to be connected to the casing and provided at the top of the first storage volume and the second storage volume.

As a further improvement of the above technical solution, the first storage volume and the second storage volume are two cavities being independent from each other and arranged side by side.

As a further improvement of the above technical solution, the atomization assembly includes a fluid tube, a fluid storage cotton and an atomization core part which are located in the fluid tube, and wherein an upper silicone seal is installed at an upper opening of the fluid tube, and a liquid-absorbing cotton is arranged in the upper silicone seal; a heating wire support of silicone is installed at a lower opening of the fluid tube, and an electrode is arranged in the heating wire support.

As a further improvement of the above technical solution, a glass fiber tube is clamped in the atomization core part, and the atomization core part is arranged in a first receiving groove provided on the heating wire support; and the fluid storage cotton has a first through hole, through which the atomization core part and the glass fiber tube integrally pass.

As a further improvement of the above technical solution, the battery assembly includes a plurality of batteries of different lengths.

As a further improvement of the above technical solution, the microphone assembly includes a silicone microphone bracket and a microphone board connected to the bottom of the silicone microphone bracket, wherein the microphone board is provided with a positive pole spring and a microphone integrated module.

As a further improvement of the above technical solution, a second receiving groove is provided on a left portion, corresponding to the first storage volume, of the silicone microphone bracket, and the second receiving groove is provided with a aperture at its bottom to clamp the microphone integrated module, and wherein the second receiving groove is used for clamping the heating wire support of the atomization assembly.

As a further improvement of the above technical solution, a third receiving groove is provided on a right portion, corresponding to the second storage volume, of the silicone microphone bracket, and the third receiving groove is provided with a second through hole at its bottom, the positive pole spring passes the second through hole, and wherein the third receiving groove is used for clamping the positive pole spring and the battery assembly.

As a further improvement of the above technical solution, a fourth receiving groove is provided between the first storage volume and the second storage volume, and a negative pole elastic pin is installed in the fourth receiving groove.

As a further improvement of the above technical solution, the pivotable cover assembly includes a cover body and a cover, and the cover includes a pivotable cover part and a flip buckle connected to the pivotable cover part, and a negative pole resilient sheet is mounted at the bottom of the pivotable cover part.

As a further improvement of the above technical solution, a raised fifth receiving groove is provided on a left portion, corresponding to the first storage volume, of the cover body, and the fifth receiving groove is used for accommodating the liquid-absorbing cotton in the upper silicone seal, and a suction nozzle is provided at the top of the fifth receiving groove.

As a further improvement of the above technical solution, a third through hole is provided on a right portion, corresponding to the second storage volume, of the cover body, and a connecting slot and a first connecting hole are provided on the left of the third through hole, and the pivotable cover part is connected to the cover body by the connecting slot and the first connecting hole.

As a further improvement of the above technical solution, the pivotable cover part is provided with a connecting rod and a seat, and wherein the connecting rod of the pivotable cover part is installed in the first connecting hole, and the seat of the pivotable cover part is clamped in the connecting slot.

As a further improvement of the above technical solution, a group of buckles are provided on the side surface of the cover body, and a group of holes are provided on the side surface of the first storage volume and the second storage volume and at their top portions, wherein the group of buckles include a plurality of buckles and the group of holes include a plurality of second connecting holes.

As a further improvement of the above technical solution, the buckles are engaged in the second connecting holes, such that the pivotable cover assembly connects to the casing via the buckles and the second connecting holes.

Compared with the prior art, the present disclosure has obvious advantages and beneficial effects: the pivotable cover assembly allows the removal and installation of the battery, and the discarded vaping device, with the battery removed, is not easy to cause environmental pollution; the vaping device may also be applied to batteries of different lengths, which makes the use of the vaping device more environmentally friendly and convenient; the separated first storage volume and the second storage volume separate the atomization process from the power supply process, so that the atomization assembly and the battery assembly do not interfere with each other, thereby improving the safety and service life of the vaping device.

REFERENCE SIGNS

Figure 1:
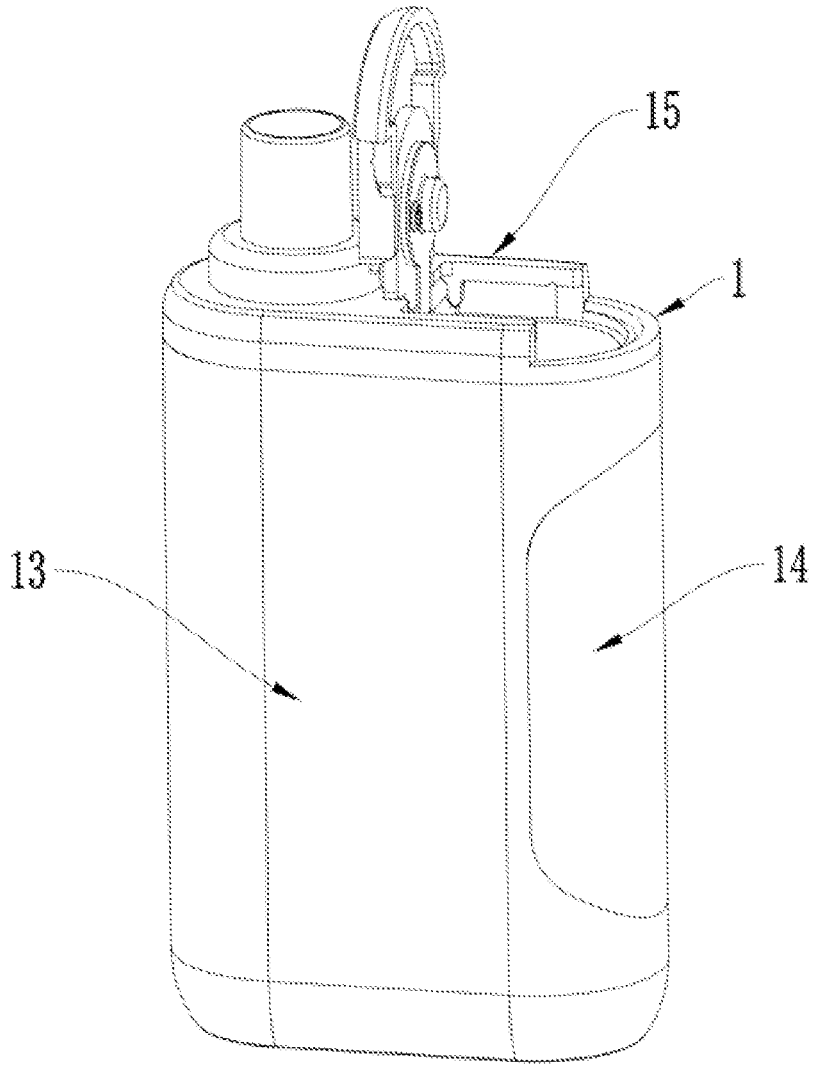
FIG. 1 is a schematic diagram of the overall structure of a vaping device of the present disclosure.
Figure 2:
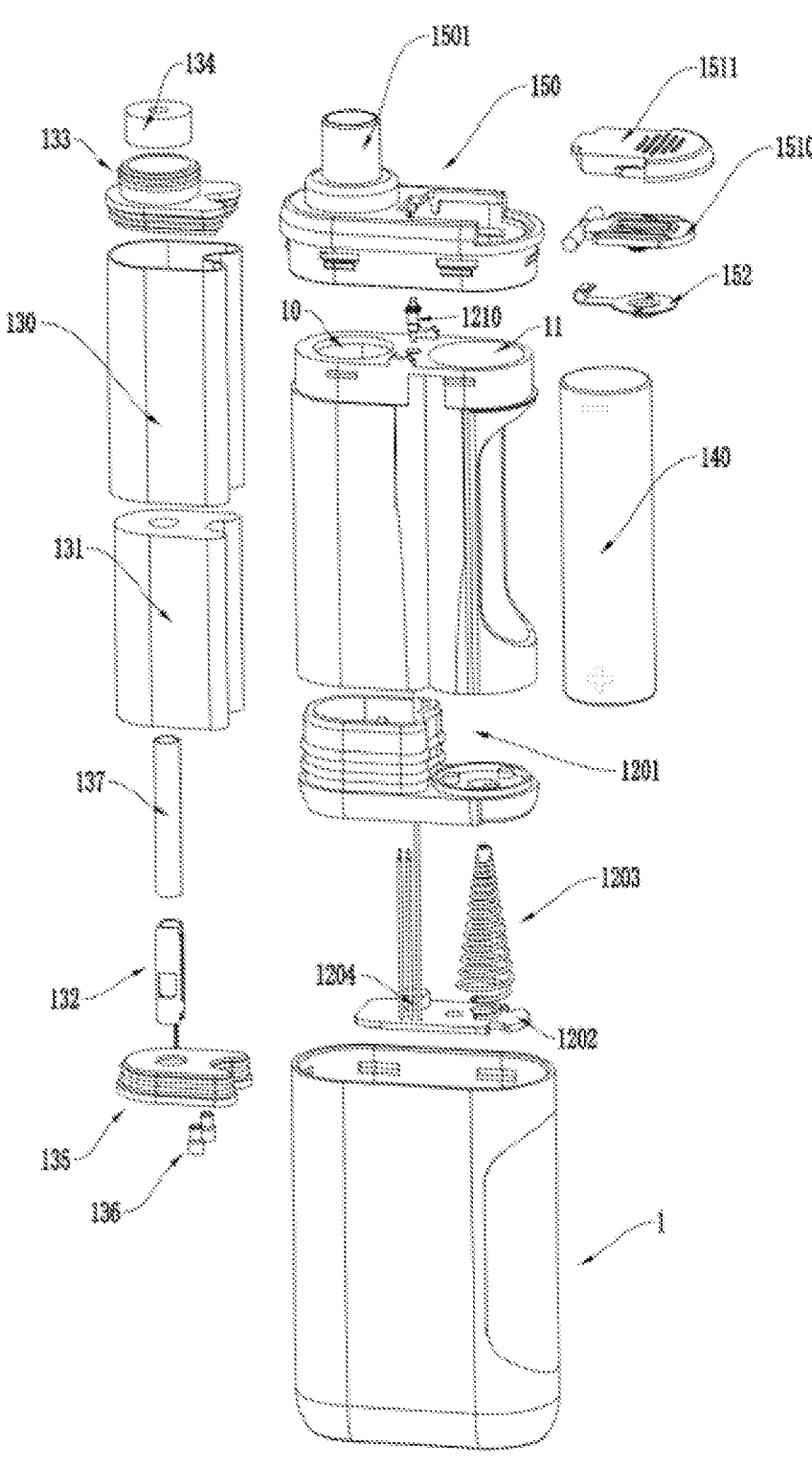
FIG. 2 is an exploded schematic diagram of the overall structure of a vaping device of the present disclosure.

1—casing; 10—first storage volume; 11—second storage volume;

12—microphone assembly; 1201—silicone microphone bracket; 1202—microphone board; 1203—positive pole spring; 1204—microphone integrated module; 1205—second receiving groove; 1206—aperture; 1207—third receiving groove; 1208—second through hole; 1209—fourth receiving groove; 1210—negative pole elastic pin;

13—atomization assembly; 130—fluid tube; 131—fluid storage cotton; 132—atomization core part; 133—upper silicone seal; 134—liquid-absorbing cotton; 135—heating wire support; 136—electrode; 137—glass fiber tube; 138—first receiving groove; 139—first through hole;

14—battery assembly; 140—battery;

15—pivotable cover assembly; 150—cover body; 1500—fifth receiving groove; 1501—suction nozzle; 1502—third through hole; 1503—connecting slot; 1504—first connecting hole; 1505—buckle; 1506—second connecting hole; 151—cover; 1510—pivotable cover part; 1511—flip buckle; 1512—connecting rod; 1513—seat; 152—negative pole resilient sheet.

DETAILED DESCRIPTION

In order to make the purpose, technical solutions and advantages of the present disclosure clearer, the present disclosure will be further described in detail below in conjunction with the accompanying drawings and implementation examples. It should be understood that the specific embodiments described here are only used to explain the present disclosure, not to limit the present disclosure.

It should be noted that when an element is referred to as being "fixed to" another element, it may be directly fixed on the other element, or there may be an intervening element for indirect fixing. When an element is referred to as being "connected to" another element, it can be directly connected to the other element, or there may be an intervening element for indirect connection. The terms "vertical", "horizontal", "left", "right" and similar expressions are used herein for purposes of illustration only.

Please refer to FIG. 1 to FIG. 10, a vaping device according to an embodiment of the present disclosure includes a casing 1, a microphone assembly 12 is provided at the bottom of the casing 1, and a first storage volume 10 and a second storage volume 11 which are integrally connected are arranged in the casing 1 and above the microphone assembly 12, wherein an atomization assembly 13 is installed in the first storage volume 10 and a battery assembly 14 is installed in the second storage volume 11. A pivotable cover assembly 15 for replacing a battery, which is configured to connect to the casing 1, is provided at the top of the first storage volume 10 and the second storage volume 11. The pivotable cover assembly 15 may realize the removal and installation of a battery 140, and the discarded vaping device (the battery is removed) is not easy to cause environmental pollution. The vaping device may also be applied to batteries of different sizes or lengths. The above configuration makes the use of the vaping device more environmentally friendly and convenient. The separated first storage volume 10 and the second storage volume 11 separate the atomization process from the power supply process, so that the atomization assembly and the battery assembly do not interfere with each other, thereby improving the safety and service life of the vaping device.

Figure 7:
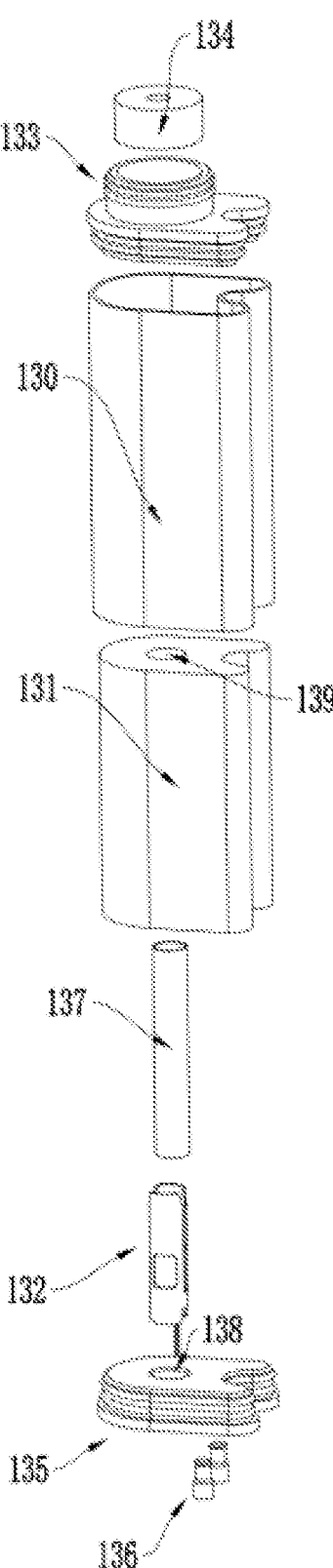
FIG. 7 is a schematic structural diagram of an atomization assembly of a vaping device of the present disclosure.

Specifically, referring to FIG. 7, the atomization assembly 13 includes a fluid tube 130, and a fluid storage cotton 131 and an atomization core part 132 which are located in the fluid tube 130. An upper silicone seal 133 is installed at an upper opening of the fluid tube 130, wherein a liquid-absorbing cotton 134 is arranged in the upper silicone seal 133. A heating wire support 135 of silicone is installed at a lower opening of the fluid tube 130, wherein an electrode 136 is arranged in the heating wire support 135. A glass fiber tube 137 is clamped in the atomization core part 132, and the atomization core part 132 is arranged in a first receiving groove 138 provided on the heating wire support 135. The fluid storage cotton 131 has a first through hole 139, through which the atomization core part 132 and the glass fiber tube 137 integrally pass.

Figure 3:
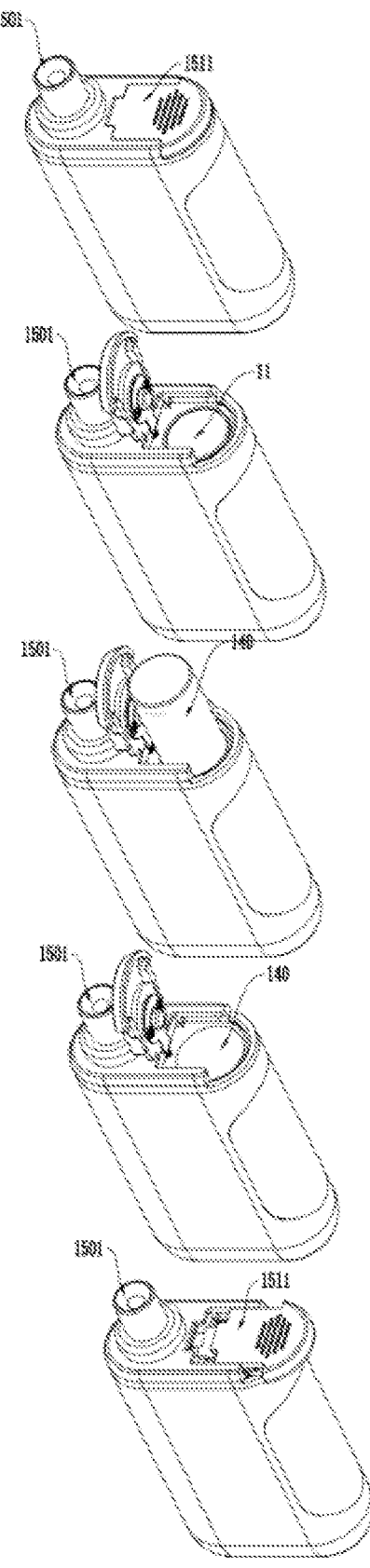
FIG. 3 shows a battery installation process of a vaping device of the present disclosure.
Figure 4:
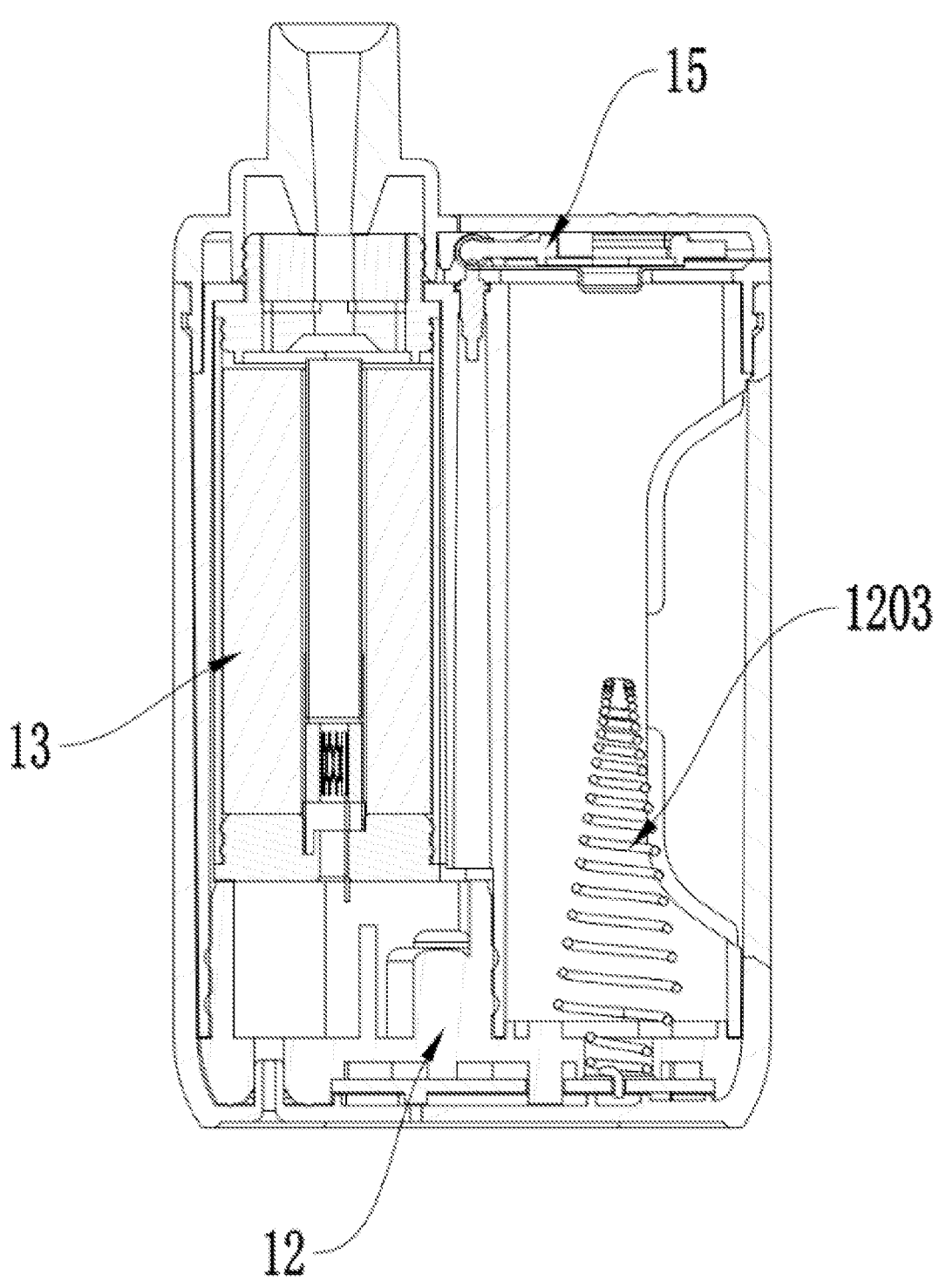
FIG. 4 is a schematic diagram of a vaping device of the present disclosure, without a battery.
Figure 5:
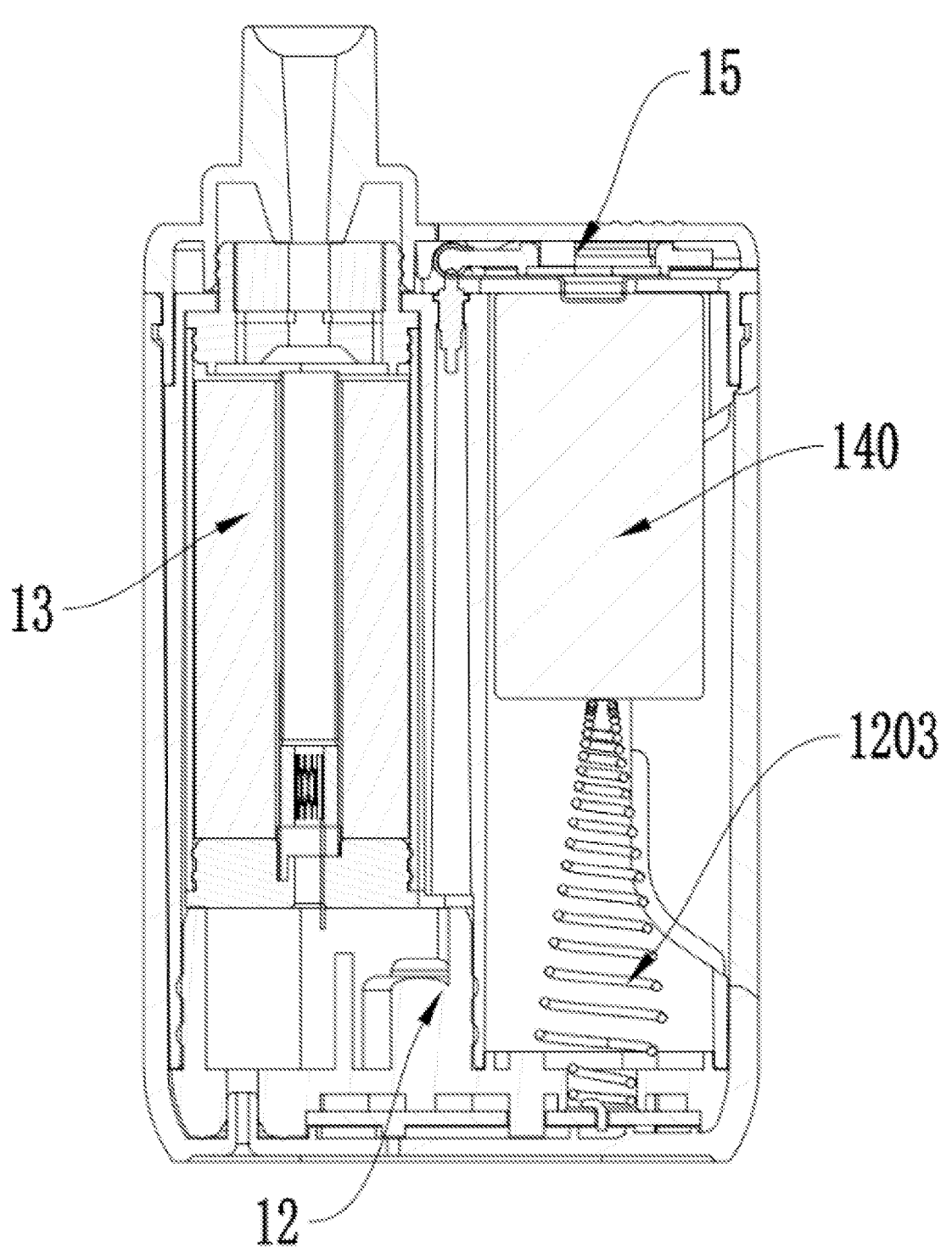
FIG. 5 is a schematic structural diagram of a vaping device of the present disclosure, equipped with a small battery.
Figure 6:
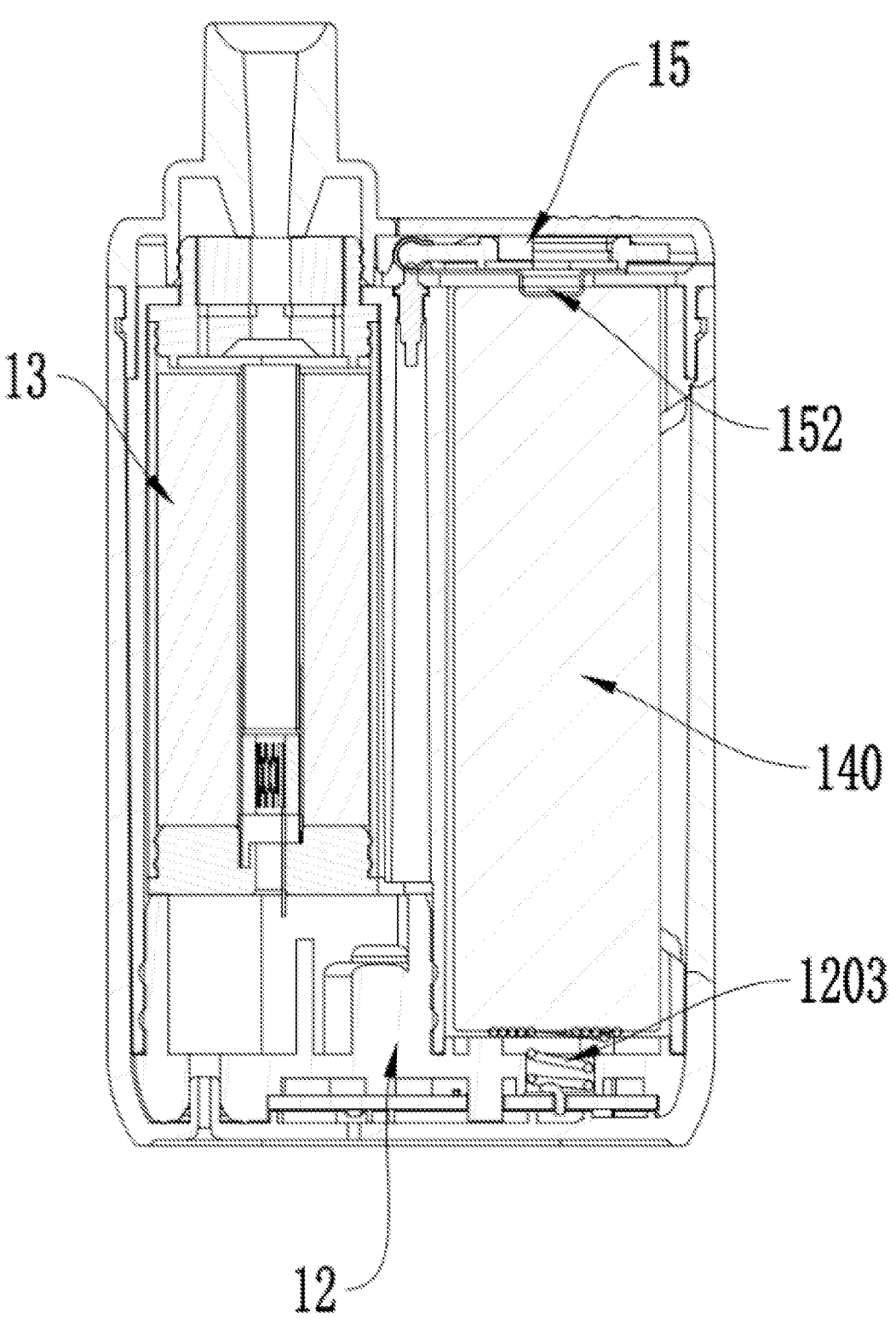
FIG. 6 is a schematic structural diagram of a vaping device the present disclosure, equipped with a large battery.

Specifically, the first storage volume 10 and the second storage volume 11 are two cavities being independent from each other and arranged side by side, and the battery assembly 14 is installed in the second storage volume 11. A fourth receiving groove 1209 is provided between the first storage volume 10 and the second storage volume 11, and a negative pole elastic pin 1210 is installed in the fourth receiving groove 1209. The battery assembly 14 may include a plurality of batteries 140 of different sizes or lengths. FIG. 3 shows the process of installing the battery 140; FIG. 4 shows the construction of a vaping device without a battery 140; FIG. 5 shows the construction of a vaping device installed with a battery 140 with a relatively short length; and FIG. 6 shows the construction of a vaping device installed with a battery 140 with a relatively long length. The vaping device is suitable for different batteries 140 of different lengths, it means that different batteries 140 of different lengths can be adapted to different vaping devices with different amounts of smoke liquid. On the one hand, resources are utilized reasonably, and on the other hand, the cost of the batteries 140 can also be saved.

Figure 11:
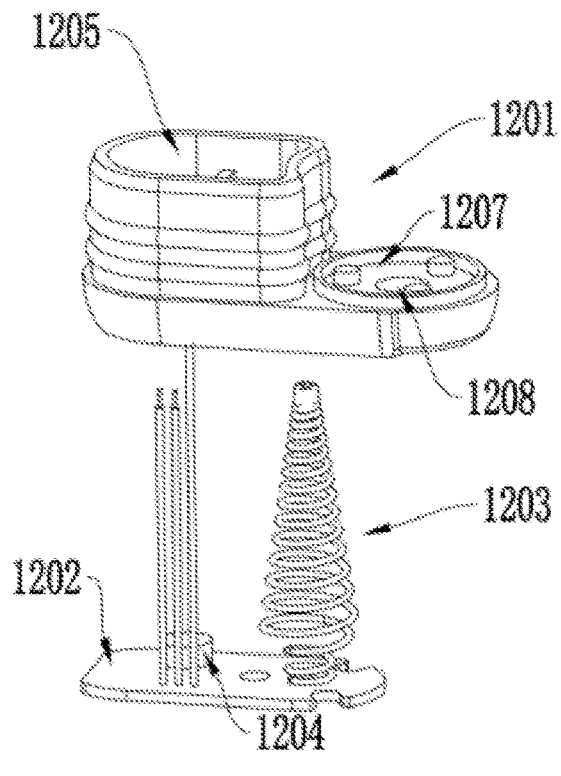
FIG. 11 is a schematic structural diagram of a microphone assembly of a vaping device of the present disclosure.
Figure 12:
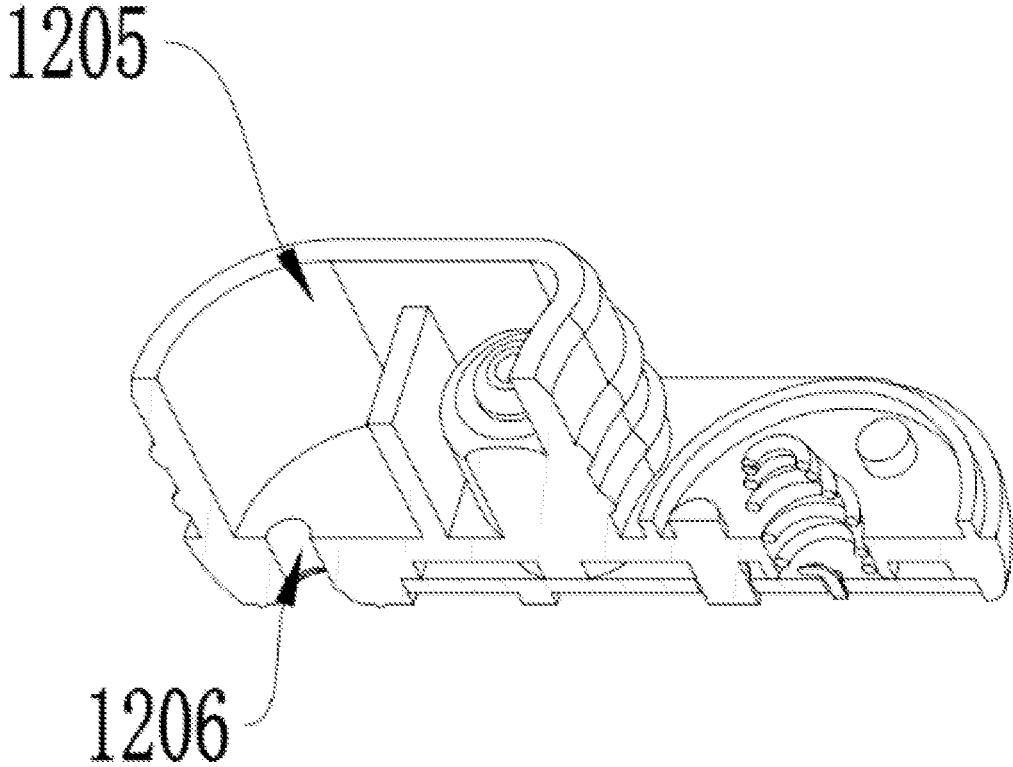
FIG. 12 is a schematic structural diagram of a microphone assembly of a vaping device of the present disclosure.

Specifically, refer to FIG. 11 and FIG. 12, the microphone assembly 12 includes a silicone microphone bracket 1201 and a microphone board 1202 connected to the bottom of the silicone microphone bracket 1201, wherein the microphone board 1202 is provided with a positive pole spring 1203 and a microphone integrated module 1204. A second receiving groove 1205 is provided on a left portion, corresponding to the first storage volume 10, of the silicone microphone bracket, and the second receiving groove 1205 is provided with a aperture 1206 at its bottom to clamp the microphone integrated module 1204, and wherein the second receiving groove 1205 is used for clamping the heating wire support 135 of the atomization assembly 13. A third receiving groove 1207 is provided on a right portion, corresponding to the second storage volume 11, of the silicone microphone bracket, and the third receiving groove 1207 is provided with a second through hole 1208 at its bottom, the positive pole spring 1203 may pass the second through hole 1208, and the third receiving groove 1207 is used for clamping the positive pole spring 1203 and the battery assembly 14.

Figure 8:
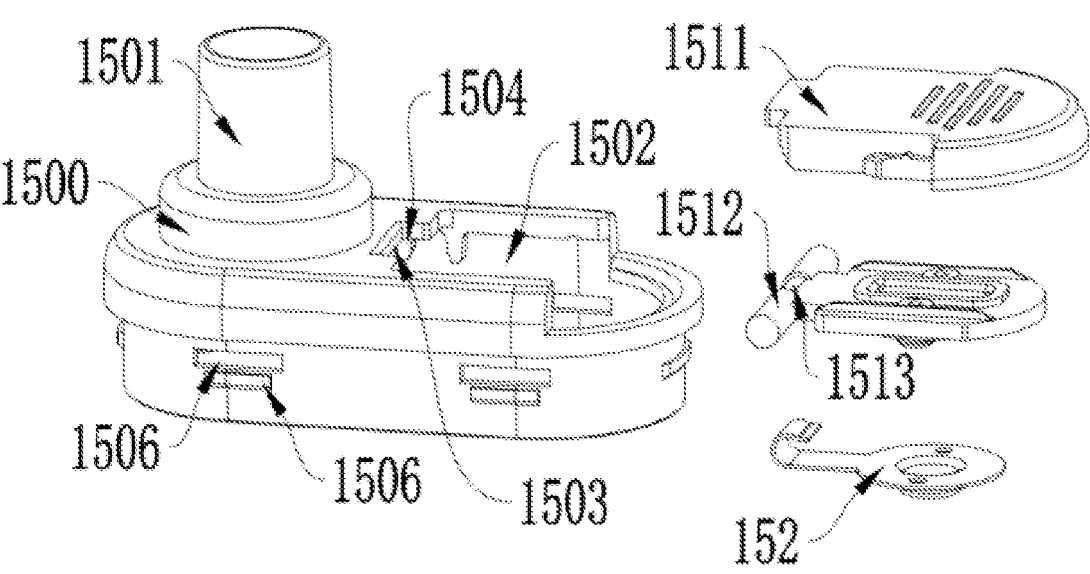
FIG. 8 is a schematic structural diagram of a pivotable cover assembly of a vaping device of the present disclosure.
Figure 9:
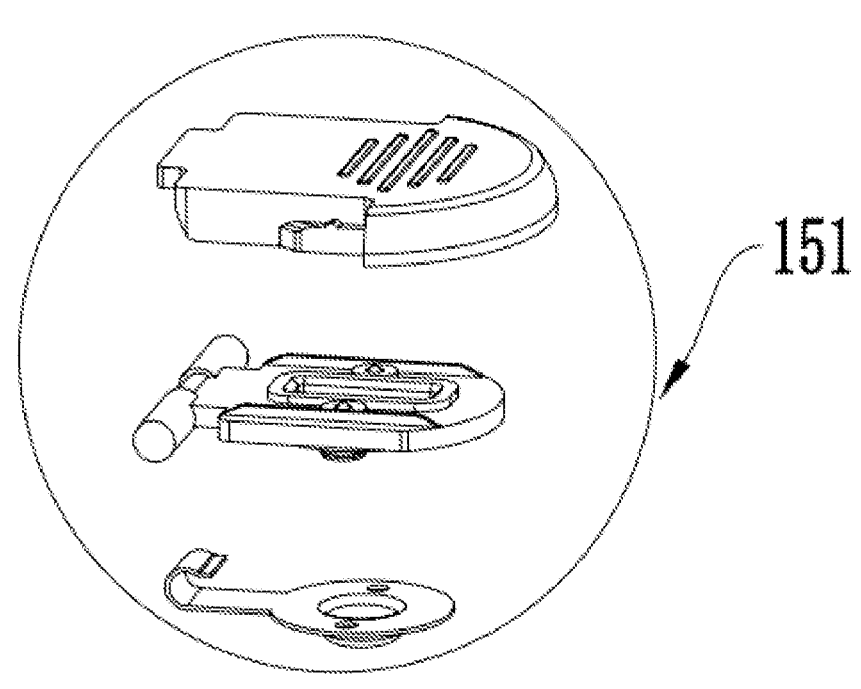
FIG. 9 is a schematic structural diagram of a pivotable cover assembly of a vaping device of the present disclosure.
Figure 10:
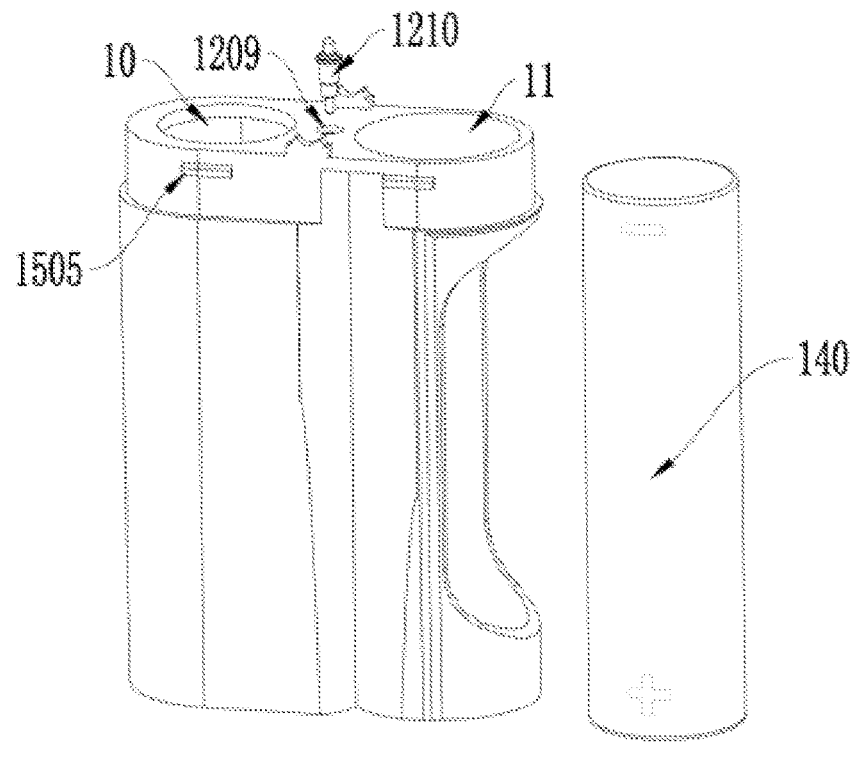
FIG. 10 is a schematic diagram of storage volumes of a vaping device of the present disclosure.

Specifically, refer to FIG. 8 and FIG. 9, the pivotable cover assembly 15 includes a cover body 150 and a cover 151. The cover 151 includes a pivotable cover part 1510 and a flip buckle 1511 connected to the pivotable cover part 1510, and a negative pole resilient sheet 152 is mounted at the bottom of the pivotable cover part 1510. A raised fifth receiving groove 1500 is provided on a left portion, corresponding to the first storage volume 10, of the cover body 150, and the fifth receiving groove 1500 is used for accommodating the liquid-absorbing cotton 134 in the upper silicone seal 133, and a suction nozzle 1501 is provided at the top of the fifth receiving groove 1500. A third through hole 1502 is provided on a right portion, corresponding to the second storage volume 11, of the cover body 150. A connecting slot 1503 and a first connecting hole 1504 are provided on the left of the third through hole 1502, and the pivotable cover part 1510 can be connected to the cover body 150 by the connecting slot 1503 and the first connecting hole 1504. The pivotable cover part 1510 is provided with a connecting rod 1512 and a seat 1513, and the connecting rod 1512 of the pivotable cover part 1510 is installed in the first connecting hole 1504, and the seat 1513 of the pivotable cover part 1510 is clamped in the connecting slot 1503. A group of buckles are provided on the side surface of the cover body 150, and a group of holes are provided on the side surface of the first storage volume 10 and the second storage volume 11 and at their top portions, wherein the group of buckles include a plurality of buckles 1505 and the group of holes include a plurality of second connecting holes 1506. The buckles 1505 are engaged in the second connecting holes 1506, such that the pivotable cover assembly 15 connects to the casing 1 via the buckles 1505 and the second connecting holes 1506.

The vaping device of the present disclosure includes a casing 1, a microphone assembly 12 is provided at the bottom of the casing 1, and a first storage volume 10 and a second storage volume 11 which are integrally connected are arranged in the casing 1 and above the microphone assembly 12, wherein an atomization assembly 13 is installed in the first storage volume 10 and a battery assembly 14 is installed in the second storage volume 11. A pivotable cover assembly 15 for replacing a battery 140, which is configured to connect to the casing 1, is provided at the top of the first storage volume 10 and the second storage volume 11. The pivotable cover assembly 15 may realize the removal and installation of the battery 140, and the discarded vaping device (the battery 140 is removed) is not easy to cause environmental pollution. The vaping device can also be applied to batteries 140 of different lengths. The above configuration makes the use of the vaping device more environmentally friendly and convenient. The separated first storage volume 10 and the second storage volume 11 separate the atomization process from the power supply process, so that the atomization assembly 13 and the battery assembly do not interfere with each other, thereby improving the safety and service life of the vaping device.

The above descriptions are only preferred embodiments of the present disclosure, and are not intended to limit the present disclosure. Any modifications, equivalent replacements and improvements made within the principles of the present disclosure shall be included within the protection scope of the present disclosure.

7

8

What is claimed is:

1. A vaping device, comprising:
a casing;
a microphone assembly provided at a bottom of the casing, wherein the casing is provided with an integrally formed storage volume structure in a space above the microphone assembly, and wherein the storage volume structure includes a first storage volume and a second storage volume arranged side by side, an atomization assembly is installed in the first storage volume and a battery assembly is installed in the second storage volume; and
a pivotable cover assembly configured to be connected to the casing and provided at a top of the first storage volume and the second storage volume, wherein the pivotable cover assembly is configured to be movable to expose the second storage volume, so as to enable removal and installation of the battery assembly.

2. The vaping device according to claim 1, wherein the atomization assembly comprises a fluid tube, a fluid storage cotton and an atomization core part which are located in the fluid tube, and wherein an upper silicone seal is installed at an upper opening of the fluid tube, and a liquid-absorbing cotton is arranged in the upper silicone seal; a heating wire support of silicone is installed at a lower opening of the fluid tube, and an electrode is arranged in the heating wire support.

3. The vaping device according to claim 2, wherein a glass fiber tube is clamped in the atomization core part, and the atomization core part is arranged in a first receiving groove provided on the heating wire support; and the fluid storage cotton has a first through hole, through which the atomization core part and the glass fiber tube integrally pass.

4. The vaping device according to claim 1, wherein the battery assembly comprises a plurality of batteries of different lengths.

5. The vaping device according to claim 1, wherein the microphone assembly comprises a silicone microphone bracket and a microphone board connected to a bottom of the silicone microphone bracket, wherein the microphone board is provided with a positive pole spring and a microphone sensor.

6. The vaping device according to claim 5, wherein a second receiving groove is provided on a left portion, corresponding to the first storage volume, of the silicone microphone bracket, and the second receiving groove is provided with aperture at its bottom to clamp the microphone sensor, and wherein the second receiving groove is used for clamping a heating wire support of the atomization assembly.

7. The vaping device according to claim 5, wherein a third receiving groove is provided on a right portion, corresponding to the second storage volume, of the silicone microphone bracket, and the third receiving groove is provided with a second through hole at its bottom, the positive pole spring passes the second through hole, and wherein the third receiving groove is used for clamping the positive pole spring and the battery assembly.

8. The vaping device according to claim 1, wherein a fourth receiving groove is provided between the first storage volume and the second storage volume, and a negative pole elastic pin is installed in the fourth receiving groove.

9. The vaping device according to claim 2, wherein the pivotable cover assembly comprises a cover body and a cover, and the cover comprises a pivotable cover part and a flip buckle connected to the pivotable cover part, and a negative pole resilient sheet is mounted at a bottom of the pivotable cover part.

10. The vaping device according to claim 9, wherein a raised fifth receiving groove is provided on a left portion, corresponding to the first storage volume, of the cover body, and the fifth receiving groove is used for accommodating the liquid-absorbing cotton in the upper silicone seal, and a suction nozzle is provided at the top of the fifth receiving groove.

11. The vaping device according to claim 9, wherein a third through hole is provided on a right portion, corresponding to the second storage volume, of the cover body, and a connecting slot and a first connecting hole are provided on a left of the third through hole, and the pivotable cover part is connected to the cover body by the connecting slot and the first connecting hole.

12. The vaping device according to claim 11, wherein the pivotable cover part is provided with a connecting rod and a seat, and wherein the connecting rod of the pivotable cover part is installed in the first connecting hole, and the seat of the pivotable cover part is clamped in the connecting slot.

13. The vaping device according to claim 9, wherein a group of buckles are provided on a side surface of the cover body, and a group of holes are provided on a side surface of the first storage volume and the second storage volume and at their top portions, wherein the group of buckles include a plurality of buckles and the group of holes include a plurality of second connecting holes.

14. The vaping device according to claim 13, wherein the buckles are engaged in the second connecting holes, such that the pivotable cover assembly connects to the casing via the buckles and the second connecting holes.

* * * * *